United States Patent
Yoshikawa et al.

(10) Patent No.: US 8,398,873 B2
(45) Date of Patent: Mar. 19, 2013

(54) THIN-SHEET GLASS SUBSTRATE LAMINATE AND METHOD OF MANUFACTURING THE SAME

(75) Inventors: Minoru Yoshikawa, Tokyo (JP); Tomohiro Yachida, Tokyo (JP)

(73) Assignee: Micro Technology Co., Ltd., Tokyo (JP)

( * ) Notice: Subject to any disclaimer, the term of this patent is extended or adjusted under 35 U.S.C. 154(b) by 0 days.

(21) Appl. No.: 13/496,609

(22) PCT Filed: Feb. 1, 2011

(86) PCT No.: PCT/JP2011/052006
§ 371 (c)(1),
(2), (4) Date: Mar. 16, 2012

(87) PCT Pub. No.: WO2012/104989
PCT Pub. Date: Aug. 9, 2012

(65) Prior Publication Data
US 2012/0223049 A1   Sep. 6, 2012

(51) Int. Cl.
*B23P 15/00* (2006.01)
(52) U.S. Cl. .............. 216/39; 428/1.6; 428/337; 438/96; 438/459
(58) Field of Classification Search .................... 428/337
See application file for complete search history.

(56) References Cited

U.S. PATENT DOCUMENTS

| 7,736,997 B2 * | 6/2010 | Takechi | 438/459 |
| 2004/0004605 A1 * | 1/2004 | David | 345/173 |
| 2004/0142118 A1 * | 7/2004 | Takechi | 428/1.6 |

FOREIGN PATENT DOCUMENTS

| JP | 06262743 A | 9/1994 |
| JP | 2003222842 A | 8/2003 |
| JP | 2008037094 A | 2/2008 |
| JP | 4565670 B1 | 10/2010 |

* cited by examiner

*Primary Examiner* — Binh X Tran
*Assistant Examiner* — David Cathey, Jr.
(74) *Attorney, Agent, or Firm* — Brooks Kushman P.C.

(57) ABSTRACT

There is provided a thin-sheet glass substrate laminate which is approximately 100% impermeable to gas or vapor and has a high transparency and a thin thickness, and a method of manufacturing the same. A support is temporarily attached to one surface of a glass substrate after forming a pattern P on the one surface, the glass substrate is thinned by etching another surface of the glass substrate, a film base is temporarily attached to the etched another surface, the temporarily attached support is peeled off from the one surface of the glass substrate, the one surface from which the support is peeled off is laminated to a surface of a cover glass, and the temporarily attached film base is peeled off from the another surface.

7 Claims, 3 Drawing Sheets

(a)

(b)

(c)

(d)

(e)

(f)

ND METHOD OF MANUFACTURING THE SAME

THIN-SHEET GLASS SUBSTRATE LAMINATE AND METHOD OF MANUFACTURING THE SAME

CROSS-REFERENCE TO RELATED APPLICATION

This application is the U.S. national phase of PCT Appln. No. JP2011/052006 filed on Feb. 1, 2011, the disclosure of which is incorporated in its entirety by reference herein.

TECHNICAL FIELD

The present invention relates to a thin-sheet glass substrate laminate which is approximately 100% impermeable to gas or vapor and has a high transparency and a thin thickness, and a method of manufacturing the same.

BACKGROUND ART

In recent years, smart phones or tablet PCs or the like using a touch panel appear on the market, and demand for reduction in thickness, increase in transmittance as an optical characteristic, and reliability against heat and moisture absorption is increasing.

As a method achieving the reduction in thickness, there is a tendency to apply an on-cell manner in which a display cell such as LCD or EL or the like and a touch panel are integrated. However, with regard to the structure in which the display cell and the touch panel are integrated, after the display cell is fabricated, a touch sensor is fabricated on a surface of the display cell, and thus, the risk during fabrication is high and problems occur during the implementation. A solution to the above problems, which is to laminate a sensor substrate having as thin thickness as possible to the display cell, may obtain an effect similar to that of the on-cell manner.

However, if a thin film is used as the material for the sensor substrate, the resistance value of an electrode has to be decreased in the case of requiring high performance characteristics. In this case, a process performed at a high temperature is required, and in this regard, there is limitation to the thin film.

As required by the circumstance, the present inventors invented a flexible glass substrate described in Patent Literature 1. However, as the above-described requirement from the market is increasing, a touch panel which is thinner and lighter, has a high transparency in order to extend the lifespan of a battery, and has high performances and reliability, is desired to be developed.

However, the flexible glass described in Patent Literature 1 invented by the present investors is a product for thinning a glass to a maximum extent, and it is very difficult to further thin the glass. On the other hand, the thinned glass becomes easily broken so that a base film should be attached, and thus, the base film is a necessary constituent element. Therefore, the current circumstance is that the thickness of the base film has to be thinned in order to simply thin the flexible glass. If the thickness of the base film becomes thinner, the entire thickness will become thinner, and the transmittance as an optical characteristic will also be improved.

Under such a circumstance, though there are difficulties in meeting requirements from the market, the present inventors invented the present invention by changing minds.

Prior Art Document
Patent Literature
Patent Literature 1: Japanese Patent No. 4565670

SUMMARY OF INVENTION

Problem to be Solved by the Invention

The present invention described below was made in response to the further demand from the market. That is, the present invention provides a thin-sheet glass substrate laminate which is approximately 100% impermeable to gas or vapor and has a higher transparency and a thinner thickness compared with the prior art, and a method of manufacturing the same.

Means for Solving Problem

The object may be achieved by providing a method of manufacturing a thin-sheet glass substrate laminate, comprising: temporarily attaching a support to one surface of a glass substrate by an acid-resisting adhesive after forming a pattern on the one surface; thinning the glass substrate by etching another surface of the glass substrate, and temporarily attaching a self-attachable slightly-adhesive film base on the etched another surface; peeling off the temporarily attached support from the one surface of the glass substrate; laminating the one surface from which the support is peeled off to a surface of a cover glass, a cover film or a display panel; and peeling off the temporarily attached film base from the another surface.

The object may also be achieved by providing a method of manufacturing a thin-sheet glass substrate laminate, comprising: temporarily attaching a support to one surface of a glass substrate by an acid-resisting adhesive after forming a pattern on the one surface; thinning the glass substrate by etching another surface of the glass substrate, and temporarily attaching a self-attachable slightly-adhesive film base to the etched another surface; peeling off the temporarily attached support from the one surface of the glass substrate; temporarily attaching a second film base to the one surface; peeling off the temporarily attached film base from the another surface; laminating a surface exposed by peeling off the film base to a surface of a cover glass, a cover film or a display panel; and peeling off the temporarily attached second film base from the one surface.

An FPC, or a COG substrate having an attached IC may be mounted on the one surface of the glass substrate.

The glass substrate is a large glass substrate, each of the film base and the second film base has a size corresponding to that of the large glass substrate, and the glass substrate may be cut into a product size after peeling off the support or after temporarily attaching the second film base.

Advantageous Effects of Invention

According to the present invention, a support is temporarily attached to one surface of a glass substrate by an acid-resisting adhesive after forming a pattern on the one surface, the glass substrate is thinned by etching another surface of the glass substrate, a self-attachable slightly-adhesive film base is temporarily attached to the etched another surface, the temporarily attached support is peeled off from the one surface of the glass substrate, and then, the one surface from which the support is peeled off is laminated to a surface of a cover glass, a cover film or a display panel, and the temporarily attached film base is peeled off from the another surface, or alternatively, a second film base is temporarily attached to the one surface, the temporarily attached film base is peeled off from the another surface, a surface exposed by peeling off the film base is laminated to a surface of a cover glass, a cover film or a display panel, and the temporarily attached second film base is peeled off from the one surface. Consequently, provided is a thin-sheet glass substrate laminate which is approximately 100% impermeable to gas or vapor and has a high transparency and a thin thickness. Also, the glass may be processed at a high temperature and is a material which is highly advantageous to high performances of a sensor, and thus, an effect similar to that of the on-cell manner can be achieved by thinning the glass and only laminating the glass to the display cell.

Figure 1:
FIG. 1 is a diagram for describing a method of manufacturing a thin-sheet glass substrate laminate of the present invention, as an illustrative diagram showing a thinning process and a base film attaching process.
Figure 1:
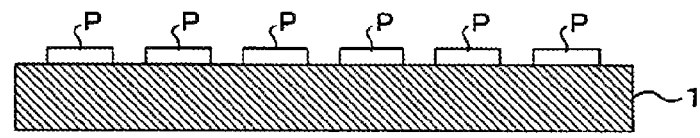
Figure 1:
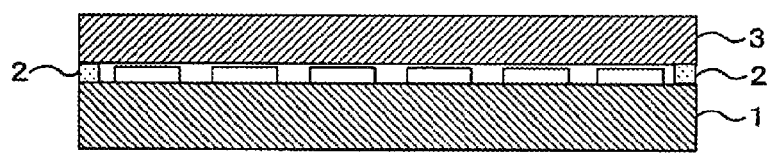
Figure 1:
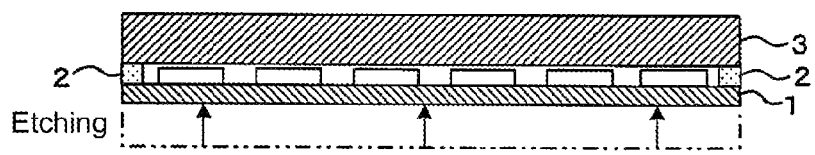
Figure 1:
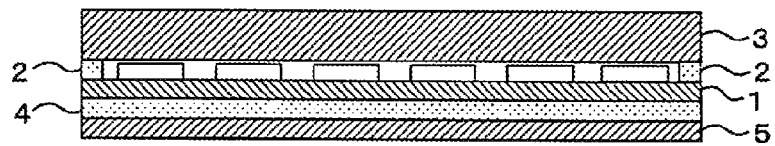
Figure 1:
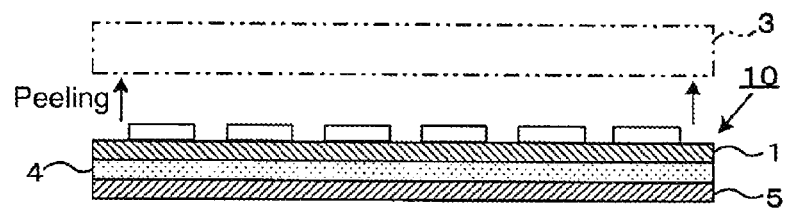

DESCRIPTION OF THE REFERENCE NUMERALS IN THE DRAWINGS 1 glass substrate
2 adhesive
3 support
4 4A, 4B slightly-adhesive tape
5 5A, 5B film base
6 cover glass
7 adhesive
8 FPC (flexible printed substrate)
9 IC
10 film base-temporarily attached substrate
P pattern

DETAILED DESCRIPTION OF INVENTION

Figure 2:
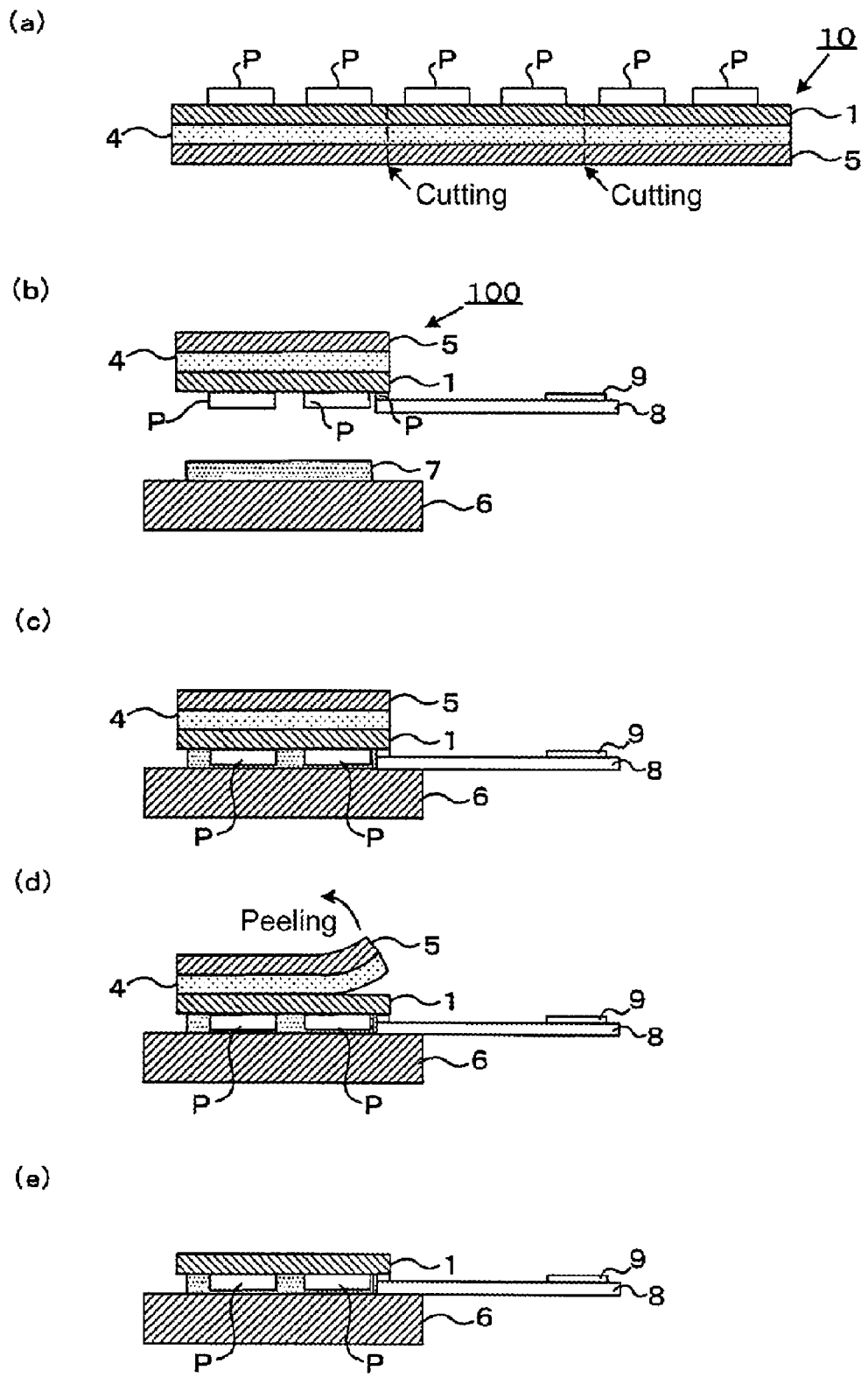
FIG. 2 is a diagram for describing a method of manufacturing a thin-sheet glass substrate laminate of the present invention, as an illustrative diagram showing a transferring process of the thin-sheet glass substrate.
Figure 3:
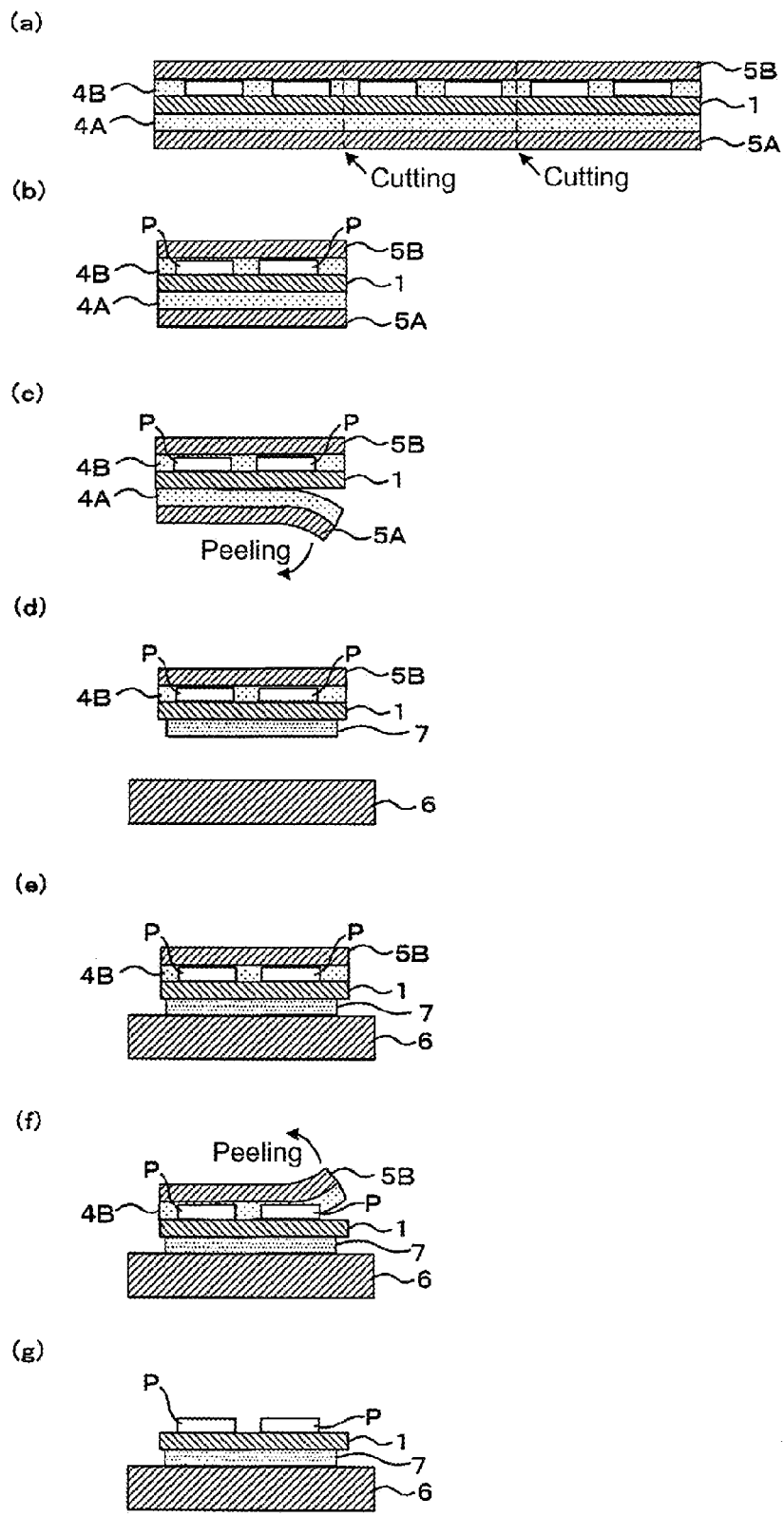
FIG. 3 is an illustrative diagram showing a thin-sheet glass substrate laminating process in another method of manufacturing a thin-sheet glass substrate laminate of the invention.

The best mode for carrying out the present invention will be explained in detail with reference to the attached drawings. FIG. 1 is a diagram for describing a method of manufacturing a thin-sheet glass substrate laminate of the present invention, as an illustrative diagram showing a thinning process and a base film attaching process; FIG. 2 is a diagram for describing a method of manufacturing a thin-sheet glass substrate laminate of the present invention, as an illustrative diagram showing a transferring process of the thin-sheet glass substrate; and FIG. 3 is an illustrative diagram showing a thin-sheet glass substrate laminating process in another method of manufacturing a thin-sheet glass substrate laminate of the invention. It should be noted that, the glass substrate shown in FIG. 1(f) is a glass substrate thinned by being etched; although it is different in thickness from the glass substrate shown in FIG. 1(a), the same reference numeral will be used because there is only a difference in thickness.

It should be noted that, though the thin-sheet glass substrate laminate of the present invention is described as an electrostatic capacity-type touch panel (hereinafter referred to as "touch panel" only) in the implementation below, it is not limited thereto.

The touch panel of the present invention shown in FIG. 2(e) is formed by laminating a glass substrate 1 to a cover glass 6 by an adhesive 7, wherein the glass substrate 1 is thinned in the process of manufacturing the thin-sheet glass substrate laminate of the present invention. The attaching surface is a surface of the glass substrate 1 on which a pattern P is formed.

The touch panel of the present invention may be used for manufacturing thin displays such as liquid crystal displays, organic EL displays, plasma panel displays, electronic papers or the like or other substitutes for keyboards.

The pattern P may be formed on the glass substrate 1 by various existing methods, Examples of the methods include deposition of indium-tin compound oxide (ITO) through a dry process such as vacuum vapor deposition or sputtering or the like.

Material used for the film base 5 in the present invention is not specifically limited. For example, polycarbonate, polyethylene terephthalate, polyethylene naphthalate, polyether sulfone, polyimide, an epoxy resin, a phenol resin, a melamine resin, polyurethane, polyurea, polyethylene, polypropylene, a nylon resin, polyvinyl chloride, an acrylic resin, polystyrene, an acrylonitrile-butadiene-styrene resin, an acrylonitrile-styrene resin, polyvinylidene chloride or the like may be used. Since the film base 5 is peeled off after being temporarily attached to the thinned glass substrate 1, the thickness of the film base 5 is not specifically limited.

A method of manufacturing a touch panel of the present invention will be explained below in detail with reference to FIG. 1.

First, as shown in FIG. 1(a), a glass substrate 1 is prepared. Although the thickness of the glass substrate 1 is not specifically limited, a preferred thickness ranges from 0.2 mm to 0.7 mm considering workability, if the glass substrate 1 has a thickness of 0.2 mm, the glass substrate 1 may be configured in a square shape having a side length of 300 mm or 400 mm, and if the glass substrate 1 has a thickness of 0.7 mm, the glass substrate 1 may be configured in a square shape having a side length of 1 m. A size of the unprocessed glass substrate 1 may be appropriately determined considering ease of handing relative to a sheet thickness.

Subsequently, after deposition treatment is carried out to a surface of the glass substrate 1 (i.e. the upper surface in FIG. 1(b)) by CVD, sputtering, deposition, plating or the like, a pattern P is formed by photo-etching or printing or the like. It should be noted that the pattern P may be of a single-layer structure or a multiple-layer structure, In the present invention, since the pattern may be formed on the glass substrate 1 having a large sheet thickness, a large size of the substrate may be used. In addition, in a process at a high temperature ranging from 150° C. to 350° C. required for the pattern formation, a plastic film has a problem with heat resistance. On the contrary, the present invention has no problem with heat resistance, since the pattern is formed on the glass substrate 1 prior to the lamination of the film base 5.

Subsequently, as shown in FIG. 1(c), a support 3 is temporarily attached through an adhesive 2 to the one surface of the glass substrate 1 having the pattern P formed thereon. Although a glass sheet or a resin sheet is available for the support 3, an elastic film material may also be used. The adhesive 2 is applied to a peripheral portion of the glass substrate 1 in order to readily peel off the support 3 later, An acid-resisting adhesive is used for the adhesive 2 to prevent invasion by an etching solution into a space between the glass substrate 1 and the support 3 during the etching.

Subsequently, as shown in FIG. 1(d), another surface of the glass substrate 1 the lower surface in FIG. 1(d)) is thinned through etching using hydrofluoric acid or the like. In the present invention, the glass substrate 1 is thinned to a sheet thickness ranging from 2 μm to 50 μm. In the present invention, since the glass substrate 1 may be etched in a state having the support 3, a thinner substrate can be achieved. This is the effect produced by the invention disclosed in Patent Literature 1. Here, the sheet thickness is not limited thereto.

After the glass substrate 1 is thinned to a desired thickness by the etching, as shown in FIG. 1(*e*), a film base 5 is temporarily attached to another surface of the glass substrate 1 (i.e. the lower surface in FIG. 1(*e*)) by a slightly-adhesive tape 4.

However, although the film base 5 is used for preventing the thinned glass substrate 1 from cracking, the film base 5 will be peeled off after the glass substrate 1 is attached to the cover glass 6. Therefore, other materials may be used for the slightly-adhesive tape 4 so long as the film base 5 is maintained to substantially perform the function.

For example, attachable films without use of adhesive, such as UV hardening dicing tape of SUMILITE (registered trademark) FSL manufactured by Sumitomo Bakelite Co., Ltd., slightly-adhesive films made of silicone and urethane-acrylic, self-attachable slightly-adhesive films having a peel strength ranging from 0.01 to 0.02 (N/25 mm), and FIXFILM (registered trademark) of FUJICOPIAN Co., Ltd., may be used.

Subsequently, as shown in FIG. 1(*f*), the support 3 temporarily attached to one surface the glass substrate 1 is peeled off from the glass substrate 1. Consequently, as shown in FIG. 1(*f*), a film base-temporarily attached substrate 10, in which the pattern P is formed and the thinned glass substrate 1 and the film base 5 are temporarily attached by the slightly-adhesive tape 4, may be manufactured. A method such as softening treatment by heat, photolytic degradation, or peeling by a blade or the like may be used for peeling off the support 3.

Then, a thin-sheet glass substrate transferring process is performed as shown in FIG. 2.

First, as shown in FIG. 2(*a*), the film base-temporarily attached substrate 10 manufactured as above is cut into a product size. It should be noted that, although in the current embodiment, the glass substrate is transferred to the cover glass after cutting a large substrate into the product size, it is possible to transfer the glass substrate to the cover glass or the display cell prior to being cut into products while maintaining the state of the large substrate, and then to cut the glass substrate into the product size.

Subsequently, a surface of the film base-temporarily attached substrate 100 cut into the product size, on which the pattern P is formed, is attached to the cover glass 6 having an adhesive 7 applied on a surface thereof (refer to FIGS. 2(*b*) and 2(C)). Here, although the adhesive 7 is applied to a side of the cover glass 6, the adhesive 7 may also be applied to a side of the film base-temporarily attached substrate 100. Before the attaching, an FPC (flexible printed substrate) 8 provided with an IC 9 is mounted. The adhesive 7 has a thickness ranging from 5 μm to 200 μm, which may vary depending on the thickness of the FPC 8, generally ranging from 50 μm to 125 μm, preferably ranging from 75 μm to 125 μm, but is not limited thereto. It should be noted that a COG substrate having an attached IC may be a substitute for FPC.

Subsequently, as shown in FIG. 2(*d*), the film base 5 (indicating a cut film base) is peeled off from the glass substrate 1 (indicating a glass substrate cut into the product size). Consequently, as shown in FIG. 2(*e*), a touch panel formed by laminating the thinned glass substrate 1 to the cover glass 6 by the adhesive 7 is completed. It should be noted that the method of peeling off the film base 5 varies according to materials for the used slightly-adhesive tape 4.

According to the manufacturing method of the invention, since a touch panel not including any film base, which is a necessary component in the related art, can be manufactured, reduction in thickness and increase in transmittance as an optical characteristic can be achieved compared with the prior art. Furthermore, it does not use any film base, and thus, it is advantageous in terms of thermal characteristics.

It should be noted that, other embodiments of the method of manufacturing the thin-sheet glass substrate laminate below may be used.

For example, as shown in FIG. 3(*a*), a film base 5B is temporarily attached to a surface, from which the support 3 is peeled off as shown in FIG. 1(*f*), by a slightly-adhesive tape 4B. It should be noted that in FIG. 3(*a*), in order to distinguish the film base 5B and the slightly-adhesive tape 4B from the film base 5A and the slightly-adhesive tape 4A, different reference numerals are used, but these film bases and slightly-adhesive tapes may be the same as the film base 5 and the slightly-adhesive tape 4 described above, Also, the slightly-adhesive tapes 4A and 4B may have the same material, but preferably, the slightly-adhesive tape 4B has an adhesive force slightly stronger than that of the slightly-adhesive tape 4A. This is because the film base 5A is peeled off prior to the peeling of the film base 5B.

Subsequently, according to the same description as above, a cutting process is performed according to a product size (FIG. 3(*b*)), then the film base 5A is peeled off while applying an adhesive 7 to the peeling surface (FIGS. 3(*c*) and 3(*d*)), and then a cover glass 6 is attached thereto (FIG. 3(*e*)). It should be noted that the adhesive 7 may be applied to a side of the cover glass 6. Subsequently, after peeling off the film base 5B, a touch panel having an exposed pattern P on a surface thereof as shown in FIG. 3(*g*) may be manufactured. As such, since an FPC mounting surface appears as an upper surface, the thickness of the adhesive 7 may be thinned to about 5~20 μm.

What is claimed is:

1. A method of manufacturing a thin-sheet glass substrate laminate, comprising:
   temporarily attaching a support to one surface of a glass substrate by an acid-resisting adhesive after forming a pattern on the one surface;
   thinning the glass substrate by etching another surface of the glass substrate;
   temporarily attaching a self-attachable slightly-adhesive film base to the etched another surface;
   peeling off the temporarily attached support from the one surface of the glass substrate;
   laminating the one surface from which the support is peeled off to a surface of a cover glass, a cover film or a display panel; and
   peeling off the temporarily attached film base from the another surface.

2. A method of manufacturing a thin-sheet glass substrate laminate, comprising:
   temporarily attaching a support to one surface of a glass substrate by an acid-resisting adhesive after forming a pattern on the one surface;
   thinning the glass substrate by etching another surface of the glass substrate;
   temporarily attaching a self-attachable slightly-adhesive film base to the etched another surface;
   peeling off the temporarily attached support from the one surface of the glass substrate;
   temporarily attaching a second film base to the one surface;
   peeling off the temporarily attached film base from the another surface;
   laminating a surface exposed by peeling off the film base to a surface of a cover glass, a cover film or a display panel; and
   peeling off the temporarily attached second film base from the one surface.

3. The method of manufacturing a thin-sheet glass substrate laminate of claim 1, wherein an FPC, or a COG substrate having an attached IC is mounted on the one surface of the glass substrate.

4. The method of manufacturing a thin-sheet glass substrate laminate of claim 1, wherein the glass substrate is a large glass substrate, each of the film base and the second film base has a size corresponding to that of the large glass, and the glass substrate is cut into a product size after peeling off the support or after temporarily attaching the second film.

5. The method of manufacturing a thin-sheet glass substrate laminate of claim 2, wherein an FPC, or a COG substrate having an attached IC is mounted on the one surface of the glass substrate.

6. The method of manufacturing a thin-sheet glass substrate laminate of claim 2, wherein the glass substrate is a large glass substrate, each of the film base and the second film base has a size corresponding to that of the large glass, and the glass substrate is cut into a product size after peeling off the support or after temporarily attaching the second film.

7. The method of manufacturing a thin-sheet glass substrate laminate of claim 3, wherein the glass substrate is a large glass substrate, each of the film base and the second film base has a size corresponding to that of the large glass, and the glass substrate is cut into a product size after peeling off the support or after temporarily attaching the second film.

* * * * *